Figure 1:
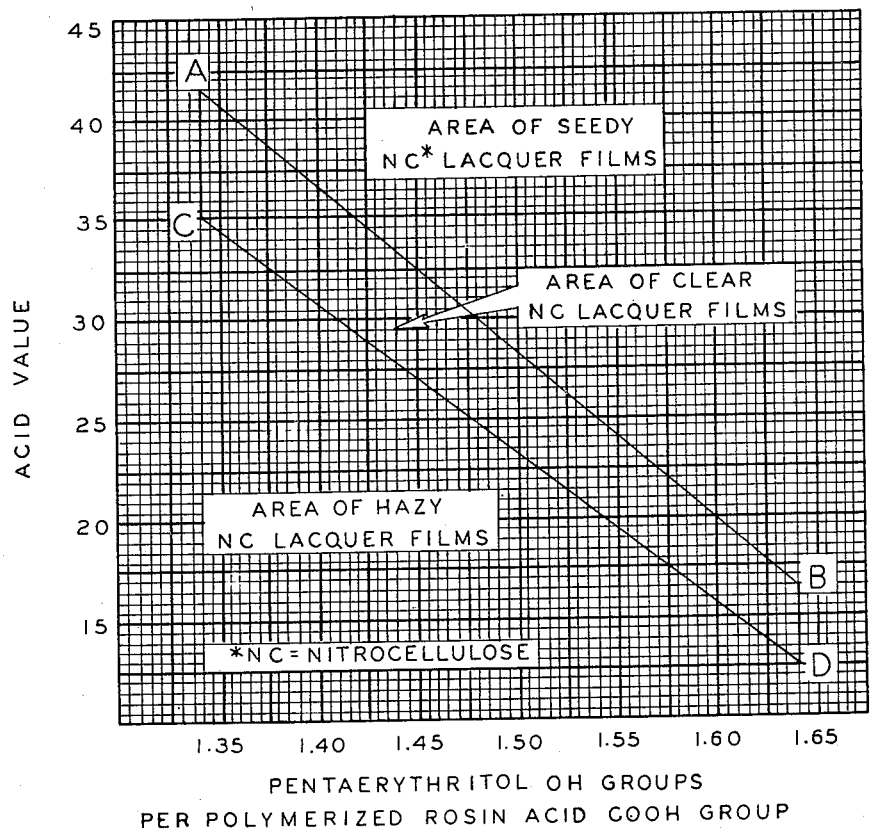

ALFRED E. RHEINECK
*INVENTOR.*

BY *Ernest G. Peterson*
AGENT

Patented Jan. 2, 1951

2,536,660

UNITED STATES PATENT OFFICE 2,536,660

NITROCELLULOSE COMPATIBLE PENTAERYTHRITOL ESTERS

Alfred E. Rheineck, Wilmington, Del., assignor to Hercules Powder Company, Wilmington, Del., a corporation of Delaware Application May 13, 1950, Serial No. 161,858

10 Claims. (Cl. 260—104)

This invention relates to esters of a pentaerythritol and a polymerized rosin acid and methods for producing the same.

It is known to produce esters of pentaerythritol and a polymerized rosin acid. Such esters are characterized by great hardness, clarity and high melting point, see U. S. 2,346,409 to Gilbert R. Anderson. In some respects these esters constitute an improvement over esters derived from glycerol and a polymerized rosin acid. It is also known to use such esters in the preparation of oleoresinous varnishes and in lacquers. However, despite the fact that the pentaerythritol esters contribute desirable properties to such compositions, it is well known that the pentaerythritol esters of rosin or polymerized rosin have an objectionable characteristic when used in nitrocellulose lacquer formulations. The coatings or films resulting from such compositions evidence incompatibility of the ingredients which is variously described as seediness, graininess or haziness.

Seediness or graininess can be observed by viewing in the direction of a source of light a dried film held horizontally at near eye level. The phenomenon is manifested as small specks spread uniformly throughout the film. Haziness may be observed by viewing the film against a dark background and is manifested as a smoky or milky condition.

In accordance with this invention, it has been found that hard resinous esters can be prepared from a pentaerythritol and a polymerized rosin acid which are truly compatible with nitrocellulose and which may be used in nitrocellulose lacquer formulations to provide perfectly clear lacquer films. Such esters are prepared by employing in the esterification reaction an excess of pentaerythritol over and above that theoretically required for complete esterification of the polymerized rosin acid employed. More specifically, such an amount of pentaerythritol is employed to provide from 1.34 to 1.64 hydroxyl groups for each carboxyl group of the polymerized rosin acid. To obtain the desired esters, the esterification reaction is stopped at a point such that the acid value of the finished ester is within a certain acid number range as defined by the area ABCD of Figure 1. As will be seen from an inspection of Figure 1, the acid number range is variable and dependent upon the particular excess of pentaerythritol employed. It has accordingly been found that nitrocellulose compatible esters of pentaerythritol and a polymerized rosin acid can be obtained by correlating the excess hydroxyl content with the acid value of the finished ester. The area ABCD of Figure 1 defines these new esters having nitrocellulose compatibility.

Pentaerythritol is made commercially by the condensation of acetaldehyde and formaldehyde. Along with the pentaerythritol monomer formed, there are formed comparatively small amounts of related hydroxylated substances. One of these compounds, dipentaerythritol, is an ether having the following structure:

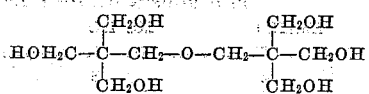

Another related compound, tripentaerythritol, is formed in even smaller amounts. According to the best evidence it is believed to have the following structural formula:

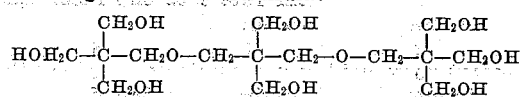

Dipentaerythritol, tripentaerythritol and higher ethers of pentaerythritol may be grouped together under the generic term "polypentaerythritols." This term is employed herein to mean those compounds having higher molecular weights than pentaerythritol monomer which are formed actually or theoretically by etherifying one or more of the hydroxyl groups of pentaerythritol monomer with other pentaerythritol molecules. The monomer, dimer, trimer, etc. of pentaerythritol refer to simple pentaerythritol, dipentaerythritol and tripentaerythritol, respectively. The term "pentaerythritol" as used herein is used in a generic sense to include pentaerythritol monomer, polypentaerythritols and pentaerythritol monomer - polypentaerythritol mixtures.

In accordance with this invention, the pentaerythritol employed in making the desired resins may be either substantially pure pentaerythritol monomer or pentaerythritol monomer-polypentaerythritol mixtures which contain at least 50% of pentaerythritol monomer and which have a hydroxyl content of at least 40%. Preferably, the pentaerythritol employed will contain from 70 to 90% pentaerythritol monomer and will have a hydroxyl content of at least 42%. Resins cannot be prepared from a material which is substantially 100% polypentaerythritols, i. e., resins having the property of compatibility with nitrocellulose to the extent that perfectly clear lacquer films can be prepared therefrom. Hazy films are always obtained. Furthermore, the presence of a large amount of polypentaerythritols having a molecular weight higher than that of dipentaerythritol appears to preclude the attainment of nitrocellulose compatibility in the resulting resin. For that reason, there is the minimum hydroxyl content limitation on the material which can be employed.

In connection with the determination of the proper proportions of polymerized rosin acid and a particular pentaerythritol to employ in accordance with this invention, it is necessary to briefly discuss the nature of polymerized rosin acid. When rosin is subjected to the various treatments known to the art to effect polymerization, the unsaturated rosin acids are believed to react with each other through their double bonds to form polymers. This reaction does not involve any products of elimination, and hence the resulting molecule has a molecular weight which is a multiple of that of the unsaturated rosin acids. It is believed that the dipolymer is the highest polymer formed. Hence, a rosin, after subjection to polymerization treatment, contains a certain proportion of the dipolymer of rosin acids and a certain proportion of unpolymerized rosin acids, in addition to whatever neutral bodies may be present. It is possible to recover from such a polymerized rosin a substantially pure dipolymer. Regardless of whether the polymerized rosin acid one is using is a substantially pure dipolymer or a mixture of dipolymer and unpolymerized rosin acid, it is convenient for the purpose of calculating the proper ratio of said polymerized rosin acid to pentaerythritol to assume the acidic component of the polymerized rosin acid to be entirely unpolymerized rosin acid. Hence, it will be understood that the rosin acid content of a polymerized rosin acid refers to the rosin acid content based on this assumption.

To determine the proper proportions of polymerized rosin acid and a particular pentaerythritol to employ, it is desirable to first determine the hydroxyl content of the pentaerythritol by the acetylation method. The combining or equivalent weight of the pentaerythritol, i. e., that amount theoretically needed to completely esterify 1 mol of rosin acid (302 parts), is given by the following formula:

$$\text{Combining weight} = \frac{17 \times 100}{\text{Per cent hydroxyl content of pentaerythritol}}$$

The amount of pentaerythritol required for 1 mol of rosin acid to provide the desired number of pentaerythritol hydroxyl groups per rosin acid carboxyl group can be obtained by multiplying the combining weight of the pentaerythritol by the desired number. From this relationship, the amount of pentaerythritol to employ with any particular polymerized rosin acid can be compulted on the basis of its rosin acid content.

Having now indicated in a general way the nature and purpose of this invention, there follows a more detailed description of specific embodiments of the invention.

*Example 1*

| | Parts |
|---|---|
| Polymerized wood rosin | 1000 |
| Pentaerythritol | 150 |

The polymerized wood rosin employed had a drop melting point of 102° C. and an acid value of 152. Hence, the rosin acid content amounted to about 82% or 820 parts. On this basis, there were 2.715 mols of rosin acid present. The pentaerythritol employed was a technical grade material containing about 83% pentaerythritol monomer and having a hydroxyl content of about 46.0%. The combining weight of the pentaerythritol was 37, and there were accordingly present 1.49 hydroxyls for each carboxyl group of the polymerized rosin.

The polymerized rosin was heated to 200° C. at which time the pentaerythritol was added with mechanical agitation. The mass was heated to 280° C. over a period of 30 minutes and held there for 1 hour with continued agitation. Mechanical agitation was then discontinued and a gentle stream of $CO_2$ was passed through the mass while maintaining a temperature of 280° C. Samples were taken at intervals as esterification progressed. It was found that the ester samples having acid values of from about 24 to about 29 (determined using phenolphthalein indicator on the esters after they had cooled to room temperature) were compatible with ½ sec. R. S. nitrocellulose at ester to nitrocellulose ratios of from 1.5–1.0 to 4.0–1.0. Esters having an acid value above 29 were found to give seedy films with nitrocellulose whereas esters having an acid value below 24 were found to give hazy films with nitrocellulose.

*Example 2*

| | Parts |
|---|---|
| Polymerized wood rosin | 1000 |
| Pentaerythritol | 160 |

The same types of polymerized rosin and pentaerythritol were employed as in Example 1. In this instance there were present, however, 1.59 pentaerythritol hydroxyls for each carboxyl group of the polymerized rosin. The method employed in esterifying the ingredients was identical with that of Example 1. It was found that the ester samples having acid values of from about 16 to about 20.5 were compatible with ½ sec. R. S. nitrocellulose at ester to nitrocellulose ratios of from 1.5–1.0 to 4.0–1.0. Esters having an acid value above 20.5 were found to give seedy films with nitrocellulose whereas esters having an acid value below 16 were found to give hazy films with nitrocellulose.

*Example 3*

| | Parts |
|---|---|
| Polymerized wood rosin | 1000 |
| Pentaerythritol | 155 |

The same types of polymerized rosin and pentaerythritol were employed as in Example 1. In this instance there were present, however, 1.54 pentaerythritol hydroxyls for each carboxyl group of the polymerized rosin. The method employed in esterifying the reactants was substantially the same as in Example 1. Esterification was continued until an ester having an acid value of 22.5 was obtained. It was found that this ester was compatible with ½ sec. R. S. nitrocellulose at ester to nitrocellulose ratios of from 1.5–1.0 to 4.0–1.0.

*Example 4*

| | Parts |
|---|---|
| Polymerized wood rosin | 1000 |
| Pentaerythritol | 135 |

The same types of ingredients as employed in Example 1 were used. This proportion, however, provided 1.34 pentaerythritol hydroxyls per each carboxyl group of the polymerized rosin. The ingredients were esterified as in Example 1 to achieve a product having an acid value of 38. This ester was compatible with ½ sec. R. S. nitrocellulose at ester to nitrocellulose ratios of from 1.5–1.0 to 4.0–1.0.

*Example 5*

| | Parts |
|---|---|
| Polymerized wood rosin | 1000 |
| Pentaerythritol | 165 |

The polymerized rosin pentaerythritol employed were the same as used in Example 1. This proportion, however, provided 1.64 pentaerythritol hydroxyls per each carboxyl group of the polymerized rosin. The ingredients were esterified as in Example 1 to achieve a product having an acid value of 15. This ester was compatible with ½ sec. R. S. nitrocellulose at ester to nitrocellulose ratios of from 1.5–1.0 to 4.0–1.0.

Attempts were made to prepare esters from polymerized wood rosin and substantially pure dipentaerythritol at various ratios of pentaerythritol hydroxyl groups to polymerized rosin acid carboxyl groups, i. e., within the range of 1.34 to 1.64 pentaerythritol hydroxyl groups per polymerized rosin acid carboxyl group. In no case was it possible to produce a truly nitrocellulose compatible resin. Similar attempts to produce nitrocellulose compatible esters from a technical polypentaerythritol, consisting of dipentaerythritol and a substantial quantity of polypentaerythritol having a molecular weight higher than that of dipentaerythritol, failed.

In preparing the subject resinous esters, it is necessary to employ a polymerized rosin acid. By this term it is meant to include rosin acids which have been polymerized by one of the various methods known to the art such as, for example, by treatment with various catalysts, as sulfuric acid, boron trifluoride, stannic chloride, zinc chloride, aluminum chloride, hydrofluoric acid, etc. by treatment of the rosin acid with a high voltage, high frequency electrical discharge, or by treatment with an acid sludge formed by treatment of rosin acid with sulfuric acid. The polymerization of a rosin acid by any of these methods is usually carried out with the rosin acid dissolved in a suitable organic solvent such as benzene, gasoline, etc. The starting material may be any rosin acid-containing material such as the various grades of wood or gum rosin, rosin acids obtainable therefrom, specific rosin acids as abietic, l-pimaric, sapinic, etc. acids, etc.

The polymerized rosin acids used in accordance with this invention are characterized by having higher melting points than the rosin acids from which they are derived. Thus, in all cases the polymerized rosin acids will have a melting point by the Hercules Drop Method of at least 85° C. The preferred polymerized rosin acids in so far as this invention is concerned are those having melting points by the Hercules Drop Method of from about 90° C. to about 135° C. However, polymerized rosin acids having higher melting points, for example, from 135° C. to 176° C. may be employed. Such products of high melting point are obtained by reduced pressure distillation of the products resulting from the treatment of rosin acid in accordance with the above-mentioned methods to effect polymerization. In this manner, unpolymerized rosin acids are wholly or partially removed.

In accordance with this invention, technical grades of pentaerythritol, pentaerythritol monomer or synthetic mixtures of pentaerythritol monomer and polypentaerythritols may be employed. Regardless of which material is employed, however, it is required that it shall contain at least 50% of pentaerythritol monomer and have a hydroxyl content of at least 40%. The preferred grade of pentaerythritol employed as a starting material is one containing from 70 to 90% pentaerythritol monomer and having a hydroxyl content of at least 42%. Included within this preferred classification are the so-called technical or resin grade pentaerythritols available commercially. Such technical or resin grade pentaerythritols frequently contain a small amount of metal compounds, the metal being introduced as catalyst or as impurities in the reactants. For the purpose of this invention it is preferred that the pentaerythritol employed be substantially free of such metal compounds, i. e., that the mineral ash content of the pentaerythritol, determined as the sulphate, be not greater than 0.30%.

The general method of esterification used in applying the principles of this invention is that known to the art for esterifying pentaerythritol and a polymerized rosin acid. Thus, an esterification temperature of at least 250° C. should be used, and preferably a temperature of from 260° C. to 280° C. It is furthermore preferred, although not required, to heat the polymerized rosin acid to a temperature of 190° C. to 210° C. prior to adding the pentaerythritol and then to raise the temperature of the ingredients to the desired esterification temperature as fast as possible. During esterification a gentle stream of inert gas such as $CO_2$, $N_2$, etc. may be passed through the reaction mixture. Heating is discontinued at a point such that the product after cooling to room temperature has an acid value (using phenolphthalein indicator) in the acid value compatibility range which applies for the particular ratio of pentaerythritol hydroxyl to polymerized rosin acid carboxyl groups employed, see Figure 1. During the period of cooling of the ester from the esterification temperature to room temperature the acid value may drop by as much as 10 points and the extent of this drop in acid value is dependent upon the conditions under which the cooling is effected.

During the esterification reaction some pentaerythritol and polymerized rosin acid may be lost by distillation. Although these losses are slight, it is important to keep them at a very minimum. If the proportion of reactants originally employed is not maintained, it will be obvious that the acid value compatibility range as defined by Figure 1 will not obtain. To prevent such losses or ingredients or to keep such losses to a minimum, it is best not to sparge the resins during preparation. However, as illustrated by the examples, the use of a gentle stream of inert gas such as $N_2$, $CO_2$, etc. to agitate the ingredients may be advantageously employed. Losses of ingredients can also be minimized by maintaining considerable free space between the top of the reaction vessel and the surface of the reaction mixture or by employing a suitable condenser. In this manner water of esterification can be removed while retaining substantially all the reactants.

The resinous esters prepared in accordance with this invention are truly compatible with the nitrocellulose in the ester to nitrocellulose ratios of from 1.5–1.0 to 4.0–1.0. Lacquers comprising the ingredients in these proportions deposit films which are perfectly clear and do not exhibit seediness, graininess or haziness. Although in the examples the resins were tested for compatibilty using ½ sec. R.S. nitrocellulose, the compatibility of the resins of this invention is not limited to compatibility with this particular type of nitrocellulose. The resins are compatible with the various types of grades of nitrocellulose used commercially in nitrocellulose formulations.

The resinous esters of this invention are also compatible with ethyl cellulose in weight ratios of from 1:1 to 1:3. The range of compatibility applies in particular for N–type ethyl cellulose having an ethoxyl content of from 46.8% to 48.5%. This compatibility characteristic is a unique property of the subject resinous esters since the prior art polymerized rosin esters of pentaerythritol are known to be incompatible with ethyl cellulose.

Where in the specification and claims reference is made to pentaerythritol monomer content of a pentaerythritol, it will be understood that determination by the dibenzal method is meant. This method involves the following steps. Prepare a benzaldehyde-methanol reagent by adding 100 ml. of anhydrous methanol to 20 ml. of benzaldehyde. Add 5 ml. of water to a dry sample of the pentaerythritol (0.35–0.55 gram) contained in an Erlenmeyer flask. Heat the 5 ml. solution to boiling, add 15 ml. of the benzaldehyde-methanol reagent and mix these solutions well. Add 12 ml. concentrated HCl and shake the reaction mixture. Allow the reaction mixture to stand for 5 minutes with occasional swirling while the greater part of the precipitate of pentaerythritol dibenzal forms and then place the flask in an ice bath for 1 hour. Dilute the reaction mixture with 25 ml. of ice cold methanol-water solution (1:1 by volume) and filter through a weighed fritted glass crucible. Wash the precipitate free of benzaldehyde with 100 ml. of methanol-water solution (1:1 by volume) at a temperature of 20–25° C. Dry the precipitate to constant weight at 120° C. (about 2 hours). The pentaerythritol monomer is calculated using the following formula in which 0.0269 represents a correction value for the solubility of the pentaerythritol dibenzal:

$$\frac{(\text{Grams precipitate} + 0.0269)\ 43.60}{\text{Grams sample}} = \text{percent pentaerythritol monomer}$$

Where in the specification and claims reference is made to acid value, it will be understood that the phenolphthalein method for determining acid value is meant. This method involves the following steps. Dissolve about 3 grams of the resin in 15 ml. of toluene. Add 50 ml. of a neutral alcohol-benzene solution (1:1 by volume) and titrate the resulting solution with 0.5 N NaOH or KOH using phenolphthalein indicator to a permanent endpoint.

Where in the specification and claims reference is made to the hydroxyl value of a pentaerythritol, it will be understood that determination by the acetylation method is meant. This method involves the following steps. Prepare an acetic anhydride-pyridine solution by adding exactly 3.5 ml. water to 1000 ml. dry pyridine. After mixing, add 140 ml. acetic anhydride to make the reagent approximately 2.4 N. Weigh 0.5 to 0.6 gram of dry pentaerythritol into a 250 ml. Erlenmeyere flask. Add 25 ml. of the pyridine-acetic anhydride reagent from a constant delivery pipette. Attach the flask to a condenser and reflux gently for 30 minutes. Flush the condensers with 30–50 ml. of water, cool the flask for 20 min. in tap water to below 20° C. and titrate at once with 1.0 N NaOH using phenolphthalein indicator. Add the NaOH slowly (about 15–20 ml. per minute) until within 10 ml. of the endpoint and from then on add the NaOH dropwise. Determine the concentration of the pyridine-acetic anhydride reagent by making a blank determination on 25 ml. under the above conditions. The hydroxyl content is calculated using the following formula wherein A is the ml. NaOH used to titrate the blank, B is the ml. NaOH used to titrate the sample and N.F. is the normality factor of the NaOH:

$$\frac{1.7\ (A-B)\ \text{N.F.}}{\text{Grams sample}} = \text{Per cent hydroxyl}$$

All parts and percentages in the specification and claims are by weight unless otherwise mentioned.

What I claim and desire to protect by Letters Patent is:

1. A hard nitrocellulose compatible resinous ester derived from a pentaerythritol and a polymerized rosin acid, said pentaerythritol being selected from the group consisting of pentaerythritol monomer and pentaerythritol-polypentaerythritol mixtures which contain at least 50% of pentaerythritol monomer and have a hydroxyl content of at least 40%, the amount of said pentaerythritol employed in making the ester being sufficient to provide from 1.34 to 1.64 hydroxyl groups for each carboxyl group of the polymerized rosin acid, the ester having an acid value as defined by the area ABCD of Figure 1.

2. A hard nitrocellulose compatible resinous ester derived from a pentaerythritol and a polymerized rosin acid, said pentaerythritol being a pentaerythritol - polypentaerythritol mixture containing from 70 to 90% pentaerythritol monomer and having a hydroxyl content of at least 42%, the amount of said pentaerythritol employed in making the ester being sufficient to provide from 1.34 to 1.64 hydroxyl groups for each carboxyl group of the polymerized rosin acid, the esters having an acid value as defined by the area ABCD of Figure 1.

3. A hard nitrocellulose compatible resinous ester derived from pentaerythritol monomer and a polymerized rosin acid, the amount of said pentaerythritol monomer employed in making the ester being sufficient to provide from 1.34 to 1.64 hydroxyl groups for each carboxyl group of the polymerized rosin acid, the ester having an acid value as defined by the area ABCD of Figure 1.

4. A hard nitrocellulose compatible resinous ester derived from a pentaerythritol and polymerized rosin, said pentaerythritol being a pentaerythritol-polypentaerythritol mixture containing from 70 to 90% pentaerythritol monomer and having a hydroxyl content of at least 42%, the amount of said pentaerythritol employed in making the ester being sufficient to provide from 1.34 to 1.64 hydroxyl groups for each carboxyl group of the polymerized rosin, the ester having an acid value as defined by the area ABCD of Figure 1.

5. A hard nitrocellulose compatible resinous ester derived from pentaerythritol monomer and polymerized rosin, the amount of said pentaerythritol monomer employed in making the ester being sufficient to provide from 1.34 to 1.64 hydroxyl groups for each carboxyl group of the polymerized rosin, the ester having an acid value as defined by the area ABCD of Figure 1.

6. A hard nitrocellulose compatible resinous ester derived from a pentaerythritol and polymerized rosin, said pentaerythritol being a pentaerythritol-polypentaerythritol mixture containing from 70 to 90% pentaerythritol monomer and having a hydroxyl content of at least 42%, the amount of said pentaerythritol employed in making the ester being sufficient to provide about 1.49 hydroxyl groups for each carboxyl group of the polymerized rosin, the ester having an acid value of from 24 to 29.

7. A hard nitrocellulose compatible resinous ester derived from a pentaerythritol and polymerized rosin, said pentaerythritol being a pentaerythritol-polypentaerythritol mixture containing from 70 to 90% pentaerythritol monomer and having a hydroxyl content of at least 42%, the amount of said pentaerythritol employed in making the ester being sufficient to provide about 1.59 hydroxyl groups for each carboxyl group of the polymerized rosin, the ester having an acid value of from 16 to 20.5.

8. A hard nitrocellulose compatible resinous ester derived from a pentaerythritol and polymerized rosin, said pentaerythritol being selected from the group consisting of pentaerythritol monomer and pentaerythritol-polypentaerythritol mixtures containing at least 50% of pentaerythritol monomer and having a hydroxyl content of at least 40%, the amount of said pentaerythritol employed in making the ester being sufficient to provide from 1.34 to 1.64 hydroxyl groups for each carboxyl group of the polymerized rosin, the ester having an acid value as defined by the area ABCD of Figure 1.

9. A hard nitrocellulose compatible resinous ester derived from a pentaerythritol and polymerized wood rosin, said pentaerythritol being a pentaerythritol-polypentaerythritol mixture containing from 70 to 90% pentaerythritol monomer and having a hydroxyl content of at least 42%, the amount of said pentaerythritol employed in making the ester being sufficient to provide from 1.34 to 1.64 hydroxyl groups for each carboxyl group of the polymerized rosin, the ester having an acid value as defined by the area ABCD of Figure 1.

10. A hard nitrocellulose compatible resinous ester derived from a pentaerythritol and polymerized rosin, said pentaerythritol being selected from the group consisting of pentaerythritol monomer and pentaerythritol-polypentaerythritol mixtures containing at least 50% of pentaerythritol monomer and having a hydroxyl content of at least 40%, the amount of said pentaerythritol employed in making the ester being sufficient to provide from 1.34 to 1.64 hydroxyl groups for each carboxyl group of the polymerized rosin, said polymerized rosin having a melting point by the Hercules Drop Method of from 90° C. to 135° C., the ester having an acid value as defined by the area ABCD of Figure 1.

ALFRED E. RHEINECK.

No references cited.